United States Patent
Vallee et al.

(10) Patent No.: US 10,240,515 B2
(45) Date of Patent: Mar. 26, 2019

(54) HEAT EXCHANGER, PARTICULARLY MOTOR VEHICLE ENGINE CHARGE AIR COOLER

(71) Applicant: Valeo Systemes Thermiques, Le Mesnil Saint Denis (FR)

(72) Inventors: Nicolas Vallee, Bazancourt (FR); Yoann Naudin, Saint Loup en Champagne (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 182 days.

(21) Appl. No.: 14/410,925

(22) PCT Filed: Jun. 25, 2013

(86) PCT No.: PCT/EP2013/063326
§ 371 (c)(1),
(2) Date: Dec. 23, 2014

(87) PCT Pub. No.: WO2014/001366
PCT Pub. Date: Jan. 3, 2014

(65) Prior Publication Data
US 2015/0192061 A1   Jul. 9, 2015

(30) Foreign Application Priority Data

Jun. 27, 2012 (FR) ..................... 12 56096

(51) Int. Cl.
| | | |
|---|---|---|
| *F02B 29/04* | (2006.01) |
| *F28F 9/02* | (2006.01) |
| *F28D 9/00* | (2006.01) |
| *F28F 1/00* | (2006.01) |
| *F28F 3/08* | (2006.01) |

(Continued)

(52) U.S. Cl.
CPC ........ *F02B 29/0462* (2013.01); *F28D 9/0037* (2013.01); *F28F 1/00* (2013.01);
(Continued)

(58) Field of Classification Search
CPC .............. F02B 29/0462; F28D 9/0037; F28D 2021/0082; F28F 1/00; F28F 9/02;
(Continued)

(56) References Cited

U.S. PATENT DOCUMENTS 3,310,869 A * 3/1967 La Porte .............. B21D 53/085
228/183
3,675,710 A * 7/1972 Ristow ..................... F28B 9/08
165/109.1

(Continued)

FOREIGN PATENT DOCUMENTS

| DE | 10016113 A1 | 10/2001 |
|---|---|---|
| DE | 10103584 A1 | 8/2002 |

(Continued)

OTHER PUBLICATIONS

English language abstract and machine-assisted English translation for DE10016113 extracted from espacenet.com database on Jan. 19, 2015, 8 pages.

(Continued)

Primary Examiner — Jon T. Schermerhorn, Jr.
(74) Attorney, Agent, or Firm — Howard & Howard Attorneys PLLC

(57) ABSTRACT

A heat exchanger, in particular a supercharging air cooler for a motor vehicle engine, comprises a housing (11) provided with a heat exchange bundle (3), a collector (13) of a cooling liquid circulating in the heat exchange bundle (3), and a collector plate (15) forming a side wall of the heat exchanger housing (11) and of the cooling liquid collector (13). The collector plate (15) is provided with orifices (27) communicating with the cooling liquid circulation pipes of the bundle (3). The collector plate (15) comprises a flat connecting part (33*a*, 35*a*) fixed to the cooling liquid collector (Continued)

(13) opposite edges of the orifices (27). The flat connecting part (33a, 35a) is contiguous to at least one of the edges.

12 Claims, 1 Drawing Sheet

(51) Int. Cl.
  *F28F 9/18* (2006.01)
  *F28F 1/02* (2006.01)
  *F28D 21/00* (2006.01)
(52) U.S. Cl.
  CPC .............. *F28F 9/02* (2013.01); *F28F 9/0224* (2013.01); *F28D 2021/0082* (2013.01); *F28F 1/025* (2013.01); *F28F 3/08* (2013.01); *F28F 9/18* (2013.01); *Y02T 10/146* (2013.01)
(58) Field of Classification Search
  CPC .. F28F 9/0224; F28F 1/025; F28F 3/08; F28F 9/18; F28F 9/182; Y02T 10/146; B23K 9/0288; Y10T 29/49373
  USPC ......... 165/41, 42, 43, 47, 51, 149–153, 158, 165/162, 173, 175, 176
  See application file for complete search history.

(56) References Cited

U.S. PATENT DOCUMENTS

| | | | | |
|---|---|---|---|---|
| 4,324,290 A | * | 4/1982 | Moranne | F28D 1/0535 165/149 |
| 4,378,174 A | * | 3/1983 | Hesse | B21D 39/02 165/149 |
| 4,917,180 A | * | 4/1990 | Wolf | F28D 1/05375 165/150 |
| 5,918,667 A | * | 7/1999 | Chiba | F28F 9/182 165/173 |
| 6,575,232 B1 | * | 6/2003 | Nakado | F28D 1/0391 165/173 |
| 6,749,015 B2 | * | 6/2004 | Moreau | F28D 1/035 165/174 |
| 2011/0214848 A1 | * | 9/2011 | Ninagawa | F28F 9/001 165/148 |
| 2014/0318754 A1 | | 10/2014 | Vallee et al. | |

FOREIGN PATENT DOCUMENTS

| | | | |
|---|---|---|---|
| EP | 2085730 A1 | 8/2009 | |
| JP | H05141893 A | 6/1993 | |
| WO | WO 2011120934 A1 * | 10/2011 | ........... F28D 9/0043 |

OTHER PUBLICATIONS

English language abstract and machine-assisted English translation for DE10103584 extracted from espacenet.com database on Jan. 19, 2015, 12 pages.

English language abstract and machine-assisted English translation for JPH05141893 extracted from espacenet.com database on Jan. 19, 2015, 6 pages.

International Search Report for PCT/EP2013/063326 dated Nov. 6, 2013, 5 pages.

\* cited by examiner

HEAT EXCHANGER, PARTICULARLY MOTOR VEHICLE ENGINE CHARGE AIR COOLER

RELATED APPLICATIONS

This application is the National Stage of International Patent Application No. PCT/EP2013/063326, filed on Jun. 25, 2013, which claims priority to and all the advantages of French Patent Application No. FR 12/56096, filed on Jun. 27, 2012, the content of which is incorporated herein by reference.

The invention relates to heat exchangers, in particular supercharging air coolers for motor vehicle engines.

In this field, heat exchangers called supercharging air coolers are known, which allow an exchange of heat between the supercharging air intended to supply the vehicle engine, and a cooling liquid. They comprise a heat exchange bundle with a stack of plates which determine between them alternating circulation channels for the supercharging air and for the cooling liquid.

Each plate guides the cooling liquid in a circuit comprising several passes. These plates generally have the form of an elongated rectangle with two long sides and two short sides, each plate comprising two bosses, a first boss having an inlet for a cooling liquid circulation circuit and the other boss having an outlet for a cooling liquid circulation circuit. The bosses are located along the same short side of the plate. They are intended to come into contact with bosses of an adjacent plate to allow cooling liquid to pass from one circulation channel to another. Thus the cooling liquid is distributed between the plates by the inlet bosses. It then flows along the passes of the cooling liquid circulation circuit to the outlet of said plates at the outlet bosses.

Each plate thus comprises a zone for heat exchange between the cooling liquid and the supercharging air at the level of the passes, and an inlet/outlet zone allowing the cooling liquid to enter and leave each plate.

One drawback of this configuration arises from the fact that the zone in which the boss is located concentrates mechanical stresses, which can lead to a breakage of elements brazed together. Another disadvantage arises from the fact that this zone is very prejudicial to the thermal performance, since the supercharging air passing through this zone, in particular between the boss and the first longitudinal end of the plate, does not pass through the exchange zone between the two fluids and therefore exchanges no or virtually no heat with the cooling liquid.

To resolve this problem, it is known to modify the exchanger components or add an additional element forming a screen and limiting the passage of the fluid to be cooled through the zone. This however makes the components and/or the production process of the exchanger more complex, which can lead to an additional cost and where applicable an increase in the weight of the exchanger.

To remedy these difficulties, it was considered by the applicant, in a patent application not yet published at the date of filing of the present application, to provide heat exchangers comprising a cooling liquid collector outside the housing. This cooling liquid is then supplied to the exchanger from the collector via a collector plate of the housing, through which the cooling liquid circulation channels of the bundle open into the collector.

The collector plate comprises collars surrounding the channels. The collars, which help with the mechanical support of the bundle plates in relation to the housing, nonetheless require the provision of additional space on the collector plate, in order to define a connecting edge of the collector plate to the walls of the housing and to the collector, which space is not insignificant in size.

The invention aims to remedy this drawback and to this end proposes a heat exchanger, namely a supercharging air cooler for a motor vehicle engine, the heat exchanger comprising a housing provided with a heat exchange bundle, a collector for a cooling liquid circulating in said heat exchange bundle, and a collector plate forming a side wall of the heat exchanger housing and of the cooling liquid collector, said collector plate being provided with orifices communicating with the cooling liquid circulation pipes of the bundle, and a flat connecting part fixed to said cooling liquid collector opposite edges, called peripheral edges, of said orifices, said flat connecting part being contiguous to at least one of said peripheral edges.

In other words, the edges of the collector plate orifices close to said connecting part have no collars. Thus the collector can be attached to the collector plate very close to the orifices, and there is no need to take into account the collars used in the abovementioned heat exchange devices. It is thus possible to provide a collector which is smaller than a collector of a heat exchanger comprising a collector plate with collars.

Said collector plate may comprise a central part fitted with said orifices, said central part being flat. In other words, no orifices then have collars.

Said orifices are for example elongated in cross section in one extension direction and are positioned in at least one row over the collector plate in a direction perpendicular to said extension direction. Said connecting part then extends at least to each end of said row.

The collector for example has a peripheral edge, preferably flat, arranged to be fixed to said connecting part of the collector plate.

The collector may comprise a wall arranged close to or at said peripheral edges contiguous to said connecting part. Close here means at a distance of 0 to 2 mm in a direction perpendicular to the extension direction of the orifices.

Said flat edge of the collector may arise from said collector wall, said flat edge advantageously being folded towards the outside so as to allow said flat edge to lie flat against said connecting part of the collector plate.

Advantageously the bundle comprises plates having a flat edge which in plan view surrounds said orifices of the collector plate.

Said flat edge of the collector and one of said flat edges of at least one of said plates of the bundle may be arranged on either side of said connecting part. Preferably they lie opposite each other relative to said connecting part.

Said flat edge of the plates of the bundle advantageously arises from folding a wall of the bundle plates towards the outside.

The collector plate may also comprise for example a flat edge part arranged adjacent to the connecting part and coming into contact with a plate forming a housing wall. The flat edge part of the collector plate advantageously comes into flat contact with a flat edge of the plate forming the housing wall.

Advantageously said flat edge part of the collector plate arises from the folding of the connecting part and is arranged at one end of the flat edge of the collector.

Said flat edge part of the collector plate is advantageously folded at right angles to said connecting part.

Said connecting part is thus fixed to said cooling liquid collector and said flat edge part is thus fixed to the plate of the housing wall, with flat-on-flat contacts, in a particularly compact construction.

Said joints are advantageously produced by brazing from an aluminum or aluminum alloy material of the components constituting the heat exchanger.

Other characteristics and advantages of the invention will appear from reading the description which follows of an exemplary embodiment, given as illustration, and with reference to the attached figures. On these drawings.

In the description which follows, identical numerical references are used to designate identical or similar elements.

Figure 1:
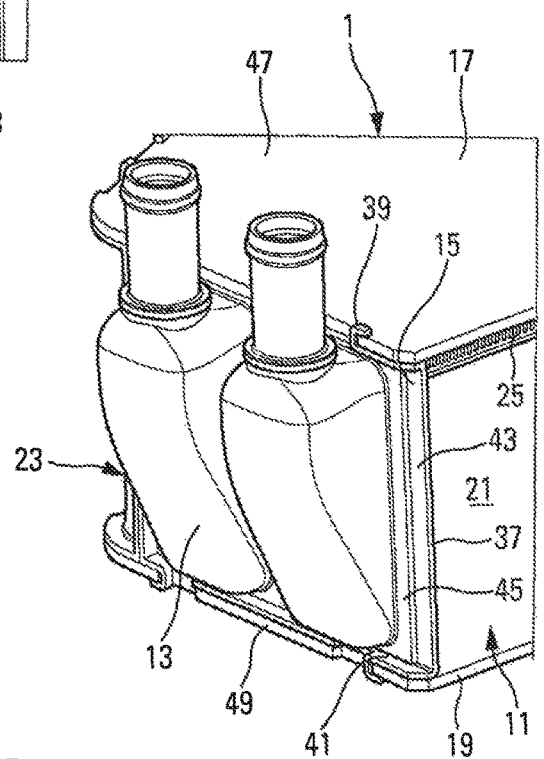
FIG. 1 is a perspective view illustrating part of a heat exchanger according to the invention.

As shown in FIG. 1, the invention concerns a heat exchanger 1 allowing an exchange of heat between a first fluid, for example a cooling liquid L, and a second fluid, in particular a fluid to be cooled, for example a gas A. It may be a supercharging air cooler in which the fluid to be cooled is a flow of compressed air A intended to supply an internal combustion engine, for example a motor vehicle engine. This flow of compressed air A is cooled by the cooling liquid L, in particular a mixture of water and glycol.

Said exchanger 1 comprises a heat exchange bundle 3, here comprising a stack of plates 5 which determine between them alternating circuits 7, 9 for the cooling liquid L and for the fluid A to be cooled. The bundle 3 here has a globally parallelepipedic form and has plates 5 associated in pairs, such that two plates 5 of the same pair determine between them a circulation channel 7 for the cooling liquid. Circuits 9 for the circulation of fluid A to be cooled are provided between two plates 5 opposite two adjacent pairs of plates.

The exchanger also comprises a housing 11 in which the bundle 3 is arranged, and a cooling liquid collector 13 mounted on the housing 11. The housing comprises a first side wall 15 located on the left on FIG. 1 and forming a collector plate. It also comprises here a second side wall, not shown on the figure, an upper wall 17 and a lower wall 19 connecting the side walls together. The housing 11 guides the fluid A to be cooled between the plates of bundle 5, from an inlet face 21 to an outlet face 23 of the bundle 3.

The exchanger 1 can thus comprise secondary exchange surfaces 25 arranged in the circulation circuits 9 of the second fluid. The secondary exchange surfaces 25 extend between two opposing plates 5 belonging to two adjacent pairs of plates 5. The secondary exchange surfaces 25 here comprise disruptive undulations positioned between the plates 5 in the circulation circuits 9 for the fluid A to be cooled.

Figure 2:
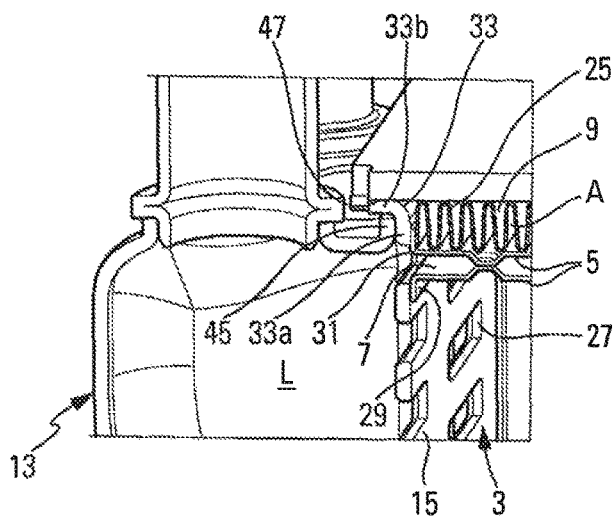
FIG. 2 is a partial section view of the exchanger in FIG. 1 showing a connection of the collector plate to the collector and to the housing.

FIG. 2 shows a partial cross section in perspective of the housing of the bundle and of the collector, more particularly at the level of their upper junction.

The left side face 15 of the housing or collector plate is perforated with orifices 27 through which the cooling liquid L circulates from the collector 13 to the bundle plates 5 via an opening 31 of the latter. Only two upper plates of the bundle 5 connected opposite each other have been shown.

At their end, these bundle plates 5 comprise an end fold 29 via which they are connected to the collector plate 15.

This end fold 29 of the bundle plates 5 is formed as a flat edge surrounding the opening 31 of the latter. The plates 5 are produced for example by deep drawing.

The collector plate 15 also comprises an upper peripheral edge 33, a lower peripheral edge 35 and two side edges 37, corresponding respectively to its top 39, bottom 41 and sides 43.

Each of the edges of the upper periphery 33 and lower periphery 35 is folded at a right angle, respectively at the top and bottom of the plate 15. These upper peripheral edge 33 and lower peripheral edge 35 each delimit a flat connecting part and a flat edge part, which are mutually adjacent and perpendicular, respectively 33a, 33b and 35a, 35b. These parts 33a, 33b and 35a, 35b receive, joined flat-on-flat, corresponding flat edges 45, 47 and 49 of the periphery of the collector and the upper plates 17 and lower plates 19 respectively of the housing.

The connection of the flat edge 45 of the collector to the collector plate 15 also extends over the sides 43 of said collector plate 15 (FIG. 1) on the flat face parts of said collector plate.

The collector plate 15 is thus connected at the top firstly to the collector by its edge 33a resting on the flat edge 45 of the collector, and secondly to the plate 17 of the upper wall of the housing by the upper folded edge 33b resting on the corresponding flat edge 47 of the housing plate.

Figure 3:
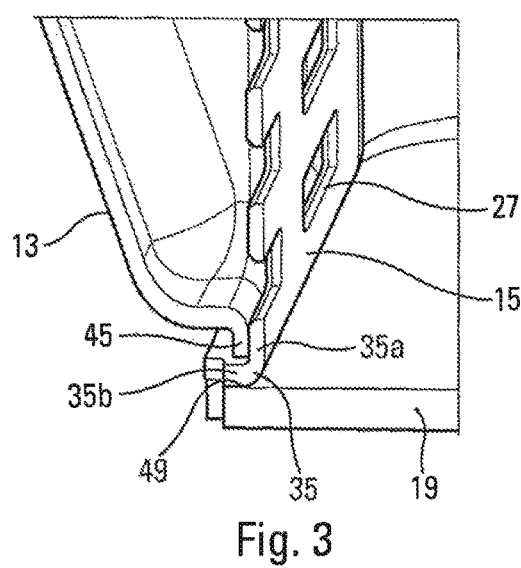
FIG. 3 is a partial section view in perspective of the exchanger in FIG. 1 showing another connection of the collector plate to the collector and housing.

Similarly, the collector plate 15 is connected at the bottom firstly to the collector by its edge 35a on the flat edge 45 of the collector, and secondly to the lower plate 19 of the housing by the lower folded edge 35b resting on the corresponding flat edge 49 of the housing plate, as shown on FIG. 3.

These edges 33a, 35a in the sense of the invention form the flat connecting part of the collector plate, which flat connecting part is contiguous to some of the so-called peripheral edges of the orifices 27, namely the edges resting opposite the collector at its junction with the collector plate. Since said connecting part is contiguous to said peripheral edges, it is understood that they have no collars.

In the embodiment shown, the collector plate 15 being flat, none of said orifices 27 is here edged with collars.

The orifices 27 may be provided with a chamfer formed in the thickness of the collector plate, said chamfer giving the orifices 27 a recessed form towards the collector.

It should be noted that the connecting part here extends parallel to the upper row of orifices 27 in the extension direction of the orifices. Similarly the connecting part extends parallel to the lower row of the orifices 27 in the extension direction of these orifices.

The flat edge 45 of the collector and the end fold 29 of the bundle plates come from each side of the plate 15 opposite each other. The flat edge 45 is also arranged at an angle to parts 33a and 33b, and similarly at the bottom.

The right angle fold of edges 33 and 35 formed at the end of the flat edge 45 of the collector, at the top and bottom respectively, facilitates assembly of the collector on the housing and provides contact surfaces for brazing.

Also the collector wall from which the flat edge 45 arises may be located at the peripheral edges of the orifices 27. This collector wall may partially straddle said orifices 27.

As indicated above, the parts are joined in a sealed manner flat-on-flat by brazing of the aluminum base material of the elements constituting the heat exchanger.

The invention claimed is:

1. A heat exchanger for a motor vehicle engine, the heat exchanger comprising a housing comprising opposing sidewalk, and an upper wall and a lower wall separating the opposing sidewalls, a heat exchange bundle disposed within the housing and comprising pairs of plates defining fluid circuits for circulating cooling liquid, a collector of the cooling liquid circulating in the heat exchange bundle, and a collector plate forming both a side wall of the collector and one of the opposing sidewalls of the housing, the collector plate comprising a flat connecting part provided with orifices communicating with the fluid circuits of the heat exchange bundle and the flat connecting part being formed without collars adjacent to the orifices, wherein each of the plates of the heat exchange bundle has an end fold bent to form a flat end edge defining an end of the plate, wherein for each pair of the pairs of plates the flat end edge of one of the plates and the flat end edge of the other one of the plates are fixed flat-on-flat to the flat connecting part on opposite sides of one of the orifices of the collector plate without the heat exchange bundle extending into the orifices of the collector plate.

2. The heat exchanger as claimed in claim 1, wherein the orifices extend through the flat connecting part of the collector plate.

3. The heat exchanger as claimed in claim 1, wherein the collector has a flat edge arranged to be fixed flat-on-flat to the flat connecting part of the collector plate.

4. The heat exchanger as claimed in claim 3, wherein the flat edge of the collector is folded away from the orifices of the collector plate.

5. The heat exchanger as claimed in claim 3, wherein the flat edge of the collector and the flat end edges of the plates of the heat exchange bundle are arranged on opposite sides of the flat connecting part.

6. The heat exchanger as claimed in claim 1, wherein the collector plate further comprises a flat edge part arranged adjacent to the flat connecting part and fixed with a plate forming one of the upper wall and the lower wall.

7. The heat exchanger as claimed in claim 6, wherein the one of the upper wall and the lower wall comprises a flat edge fixed with the flat edge part of the collector plate.

8. The heat exchanger as claimed in claim 6, wherein the flat edge part of the collector plate is an end fold bent to form the flat edge part adjacent to the flat connecting part.

9. The heat exchanger as claimed in claim 6, wherein the flat edge part of the collector plate is bent at a right angle relative to the flat connecting part.

10. The heat exchanger as claimed in claim 2, wherein the collector has a flat edge arranged to be fixed to the flat connecting part of the collector plate.

11. The heat exchanger as claimed in claim 10, wherein the flat edge of the collector is folded away from the orifices of the collector plate.

12. The heat exchanger as claim in claim 1, wherein the collector plate further comprises a flat edge part adjacent to the flat connecting part and oriented at a right angle relative to the flat connecting part.

\* \* \* \* \*